(12) United States Patent
Zhuang et al.

(10) Patent No.: US 8,579,299 B2
(45) Date of Patent: Nov. 12, 2013

(54) GASKET HAVING ADHESIVE ELEMENT

(75) Inventors: Jinfeng Zhuang, Lititz, PA (US);
Jeffery Barrall, Lititz, PA (US); EvAnn Rempala, Landisville, PA (US); Dennis Dempsey, Willow Street, PA (US)

(73) Assignee: Interface Solutions, Inc., Lancaster, PA (US)

(*) Notice: Subject to any disclaimer, the term of this patent is extended or adjusted under 35 U.S.C. 154(b) by 238 days.

(21) Appl. No.: 12/417,746

(22) Filed: Apr. 3, 2009

(65) Prior Publication Data
US 2010/0253012 A1    Oct. 7, 2010

(51) Int. Cl.
*F16J 15/02*    (2006.01)

(52) U.S. Cl.
USPC .......................................... 277/594; 277/637

(58) Field of Classification Search
USPC ................. 277/627, 649, 651, 654, 594, 596, 277/637–639, 641, 642
See application file for complete search history.

(56) References Cited

U.S. PATENT DOCUMENTS

| | | | |
|---|---|---|---|
| 1,883,609 A | | 10/1932 | Dennis |
| 2,058,010 A | * | 10/1936 | Fitch ............................. 277/649 |
| 2,211,045 A | | 8/1940 | Balfe |
| 2,753,199 A | * | 7/1956 | Victor ........................... 277/592 |
| 3,140,342 A | | 7/1964 | Ehrreich et al. |
| 3,191,950 A | | 6/1965 | Hiltner |
| 3,794,333 A | | 2/1974 | Czernik et al. |
| 3,837,657 A | * | 9/1974 | Farnam et al. ................ 277/312 |
| 3,936,059 A | | 2/1976 | Gordon |
| 4,037,009 A | | 7/1977 | Severinsen |
| 4,140,323 A | * | 2/1979 | Jacobs .......................... 277/594 |
| 4,181,313 A | | 1/1980 | Hillier et al. |
| 4,234,638 A | | 11/1980 | Yamazoe et al. |
| 4,403,796 A | | 9/1983 | Ledbetter et al. |
| 4,529,257 A | | 7/1985 | Goodman et al. |
| 4,575,578 A | | 3/1986 | Bogan et al. |
| 4,579,248 A | | 4/1986 | Gorges |
| 4,620,995 A | | 11/1986 | Otomo et al. |
| 4,743,421 A | * | 5/1988 | McDowell et al. ........... 264/129 |
| 4,778,189 A | | 10/1988 | Udagawa |
| 4,828,275 A | | 5/1989 | Udagawa |
| 4,880,669 A | | 11/1989 | Dorn et al. |
| 4,913,951 A | | 4/1990 | Pitolaj |
| 5,228,702 A | | 7/1993 | Browne et al. |

(Continued)

FOREIGN PATENT DOCUMENTS

EP    0 702 174 A    3/1996
EP    1 610 042 A    12/2005

(Continued)

OTHER PUBLICATIONS

Dictionary definition of "bead" accessed on Jan. 9, 2012 via thefreedictionary.com.*

(Continued)

*Primary Examiner* — Jennifer H Gay
*Assistant Examiner* — Blake Michener
(74) *Attorney, Agent, or Firm* — Womble Carlyle Sandridge & Rice, LLP

(57) ABSTRACT

A gasket has an upper face and a lower face. The gasket comprises an adhesive element that can have a combination of adhesion strength and compression set resistance. The adhesive element can be carried by a carrier sheet or may be directly applied to sealing surfaces in contact with the gasket.

20 Claims, 5 Drawing Sheets

(56) References Cited

U.S. PATENT DOCUMENTS

| | | | |
|---|---|---|---|
| 5,322,299 A * | 6/1994 | Terai | 277/596 |
| 5,443,887 A | 8/1995 | Nakao | |
| 5,492,343 A | 2/1996 | Smith et al. | |
| 5,531,454 A | 7/1996 | Borneby | |
| 5,549,968 A | 8/1996 | Byers et al. | |
| 5,551,706 A * | 9/1996 | Barna et al. | 277/312 |
| 5,582,415 A * | 12/1996 | Yoshida et al. | 277/592 |
| 5,618,050 A | 4/1997 | Jeanne et al. | |
| 5,702,111 A | 12/1997 | Smith | |
| 5,769,430 A * | 6/1998 | Udagawa | 277/592 |
| 5,791,654 A | 8/1998 | Gaines et al. | |
| 5,951,021 A * | 9/1999 | Ueta | 277/593 |
| 6,062,572 A * | 5/2000 | Hasegawa et al. | 277/592 |
| 6,073,938 A * | 6/2000 | Abe et al. | 277/654 |
| 6,093,358 A | 7/2000 | Schiewe et al. | |
| 6,093,467 A | 7/2000 | Forry | |
| 6,190,751 B1 | 2/2001 | Sylvester | |
| 6,241,253 B1 | 6/2001 | Dempsey et al. | |
| 6,247,703 B1 | 6/2001 | Forry et al. | |
| 6,268,020 B1 | 7/2001 | Forry et al. | |
| 6,328,313 B1 * | 12/2001 | Teranishi et al. | 277/592 |
| 6,349,945 B1 * | 2/2002 | Schmucker et al. | 277/592 |
| 6,454,276 B2 | 9/2002 | Gaines et al. | |
| 6,460,861 B1 | 10/2002 | Castner | |
| 6,530,575 B2 | 3/2003 | Poquet et al. | |
| 6,530,577 B1 | 3/2003 | Busby et al. | |
| 6,543,787 B1 | 4/2003 | Inciong | |
| 6,623,832 B2 | 9/2003 | Greven | |
| 6,626,439 B1 | 9/2003 | Forry et al. | |
| 6,682,080 B2 * | 1/2004 | Miyaoh | 277/592 |
| 6,695,320 B2 | 2/2004 | Busby et al. | |
| 6,702,296 B2 | 3/2004 | Forry | |
| 6,719,293 B1 | 4/2004 | Coles et al. | |
| 6,723,916 B2 | 4/2004 | Flaherty et al. | |
| 6,733,015 B2 | 5/2004 | Forry et al. | |
| 6,783,132 B2 * | 8/2004 | Nakamura | 277/592 |
| 6,818,822 B1 | 11/2004 | Gilliland et al. | |
| 6,866,026 B2 | 3/2005 | Mickelson | |
| 6,921,084 B2 | 7/2005 | Mickelson et al. | |
| 6,923,998 B2 | 8/2005 | Forry et al. | |
| 6,935,009 B2 | 8/2005 | Salameh | |
| 7,014,193 B2 | 3/2006 | Forry | |
| 7,073,795 B2 * | 7/2006 | Ueta et al. | 277/591 |
| 7,241,246 B2 * | 7/2007 | Beutler | 475/230 |
| 7,278,639 B2 | 10/2007 | Forry et al. | |
| 2001/0024018 A1 * | 9/2001 | Teranishi et al. | 277/594 |
| 2002/0027327 A1 * | 3/2002 | Sugimoto et al. | 277/592 |
| 2003/0234498 A1 | 12/2003 | Busby et al. | |
| 2004/0041356 A1 | 3/2004 | Smith et al. | |
| 2004/0070156 A1 | 4/2004 | Smith et al. | |
| 2004/0173978 A1 | 9/2004 | Bowen et al. | |
| 2005/0242527 A1 | 11/2005 | Barth et al. | |
| 2005/0280214 A1 | 12/2005 | Richards | |
| 2006/0103232 A1 * | 5/2006 | Beutler | 301/137 |
| 2007/0228668 A1 * | 10/2007 | Dempsey et al. | 277/627 |

FOREIGN PATENT DOCUMENTS

| | | |
|---|---|---|
| FR | 1 118 630 | 6/1956 |
| FR | 2 172 508 A | 9/1973 |
| FR | 2 367 960 A | 5/1978 |

OTHER PUBLICATIONS

Dictionary definitions of "homogeneous" and "homogeny", accessed Apr. 22, 2013 via www.thefreedictionary.com.*

Thermal Cycling Test for Life Assessment of Powertrain Seal System, Test Procedure GMW3155 REV C Short, p. 1-19, Jul. 2004, GM Worldwide Engineering Standards.

Standard Test Methods for Rubber Property—Compression Set 1, ASTM Designation: D 395-98, Annual Book of ASTM Standards, vol. 14.02.

* cited by examiner

GASKET HAVING ADHESIVE ELEMENT

BACKGROUND OF THE DISCLOSURE

The present disclosure generally relates to gaskets for sealing an interface between two components.

Gaskets have long been used to seal interfaces between components in a wide variety of machines, particularly in gasoline and diesel engines. For example, head gaskets are used to create a seal between the heads of an engine and an engine block; oil pan gaskets are used to create a seal between an oil pan and an engine block; and water pump gaskets are used to create a seal around the ports of a water pump. Most gaskets are designed specifically for their particular intended use. For example, head gaskets are designed to seal against high temperatures and pressures and the generally caustic environment within the cylinders of an engine. As another example, water pump gaskets are designed to prevent the leakage of coolant, which may consist of a mixture of water and anti-freeze that is heated and under pressure.

Two performance characteristics required of most compressible gaskets are compression resistance and sealability. Compression resistance refers to the ability of a gasket to withstand high compression forces when clamped between two flange surfaces without crushing, deforming, or yielding to the point that the mechanical properties of the gasket material and ultimately the seal provided by the gasket are compromised. Sealability refers to the ability of a gasket to resist or prevent leakage of fluid both between the gasket faces and the flanges between which the gasket is clamped (referred to as "interfacial leakage") and the ability to resist or prevent leakage of fluid through the gasket material itself (referred to as "interstitial leakage" or "bulk seal" properties).

Many different materials have been used to form gaskets. Metal gaskets traditionally have been favored because they generally have higher heat resistance, but are prone to failure in some applications due to a high level of precision needed to obtain a tight seal. In contrast, polymeric gaskets are able to conform to the surfaces more readily, but often fail over time due to chemical or physical changes in the polymer. Additionally, even prior to failure, polymeric gaskets often are perceived as failing due to oozing or creep from the sealed surfaces resulting from extrusion under pressure of the gasket. As used herein, "extrusion under pressure" refers to the radial or planar expansion or spreading of a gasket material when subject to a compression force normal to the plane of the gasket. Extrusion under pressure typically results in an undesirable permanent deformation or "compression set".

Two characteristics of a gasket material that effect interfacial sealing performance include compression stress resistance or compression set resistance and adhesion strength. Compression set resistance of a gasket material is the ability of the material to resist failure from extrusion under pressure. Adhesion strength of a gasket material is the ability of the material to adhere to the flange surface to maintain the seal and prevent failure of the gasket.

Typical known seals that rely on adhesion force for the sealing mechanism include Room Temperature Vulcanite (RTV) that typically comprises a silicon material. RTV silicones have long been used for gasketing applications in which a liquid resin is placed between two mating parts of a fluid conduit system, the parts mated to extrude the gasketing material over the mating surfaces, and then the formulation allowed to cure. The flexibility of the resulting gasket is highly suited to the sealing requirements of mated parts, particularly parts of different materials with different coefficients of thermal expansion. Such RTV cured-after-assembly silicones have also been formulated which have good resistance of a wide variety of hostile environments.

An important part of the environment resistance which these formulations achieve is due to the strong silicone/flange surface adhesion developed by particular adhesion promoters in these formulations. However, where removability of the gasket is important, e.g. where gasket replacement may be necessary for maintenance or repair of an assembly, such strong flange surface adhesion makes the use of such cured-after-assembly gaskets undesirable. Moreover, cured-after-assembly gaskets may create problems when an excessive amount of RTV is used because uncured fillets may be extruded into fluid passageways where they may contaminate fluids or cure so as to partially or completely block a passageway.

In contrast to RTV or liquid, cured-after-assembly gaskets, it is also known to utilize preformed compression gaskets as seals between automotive engine parts. Compression gaskets are easily removed and replaced but suffer the disadvantage that an inventory of gaskets must be maintained for each configuration of mating parts. Further, "compression set" can limit the performance of gasket materials under certain operating conditions.

Thus, there is a need for an improved gasket with improved performance characteristics and sealing properties.

SUMMARY OF THE DISCLOSURE

In one aspect, the disclosure is generally directed to a gasket having an upper face and a lower face. The gasket comprises an adhesive element that can have a combination of adhesion strength and compression set resistance. The adhesive element can be carried by a carrier sheet or may be directly applied to sealing surfaces in contact with the gasket.

In another aspect, the disclosure is generally directed to a gasket having an upper face for contact with a first sealing surface and a lower face for contact with a second sealing surface. The gasket comprises a base sheet and at least one adhesive element attached to the base sheet. The adhesive element is adapted to adhere to at least one of the first sealing surface and the second sealing surface. The adhesive element is adapted to provide a seal between the first sealing surface and the second sealing surface.

In another aspect, the disclosure is generally directed to an adhesive bead for being applied between a first sealing surface and a second sealing surface. The adhesive bead being adapted to adhere to at least one of the first sealing surface and the second sealing surface. The adhesive bead being adapted to provide a seal between the first sealing surface and the second sealing surface.

In another aspect, the disclosure is generally directed to a method of forming a gasket having an upper face for contact with a first sealing surface and a lower face for contact with a second sealing surface. The method comprising providing a base sheet and attaching at least one adhesive element to the base sheet. The method further comprising adhering the at least one adhesive element to at least one of the first sealing surface and the second sealing surface to provide a seal between the first sealing surface and the second sealing surface.

The entire contents of U.S. Provisional Application No. 61/041,648, which was filed Apr. 2, 2008, is hereby incorporated by reference as if presented herein in its entirety for all purposes.

According to common practice, the various features of the drawings discussed below are not necessarily drawn to scale.

Dimensions of various features and elements in the drawings may be expanded or reduced to more clearly illustrate the embodiments of the disclosure.

BRIEF DESCRIPTION OF THE DRAWINGS

Corresponding reference characters indicate corresponding parts throughout the several views of the drawings.

DETAILED DESCRIPTION OF THE ILLUSTRATED EMBODIMENTS

Figure 1:
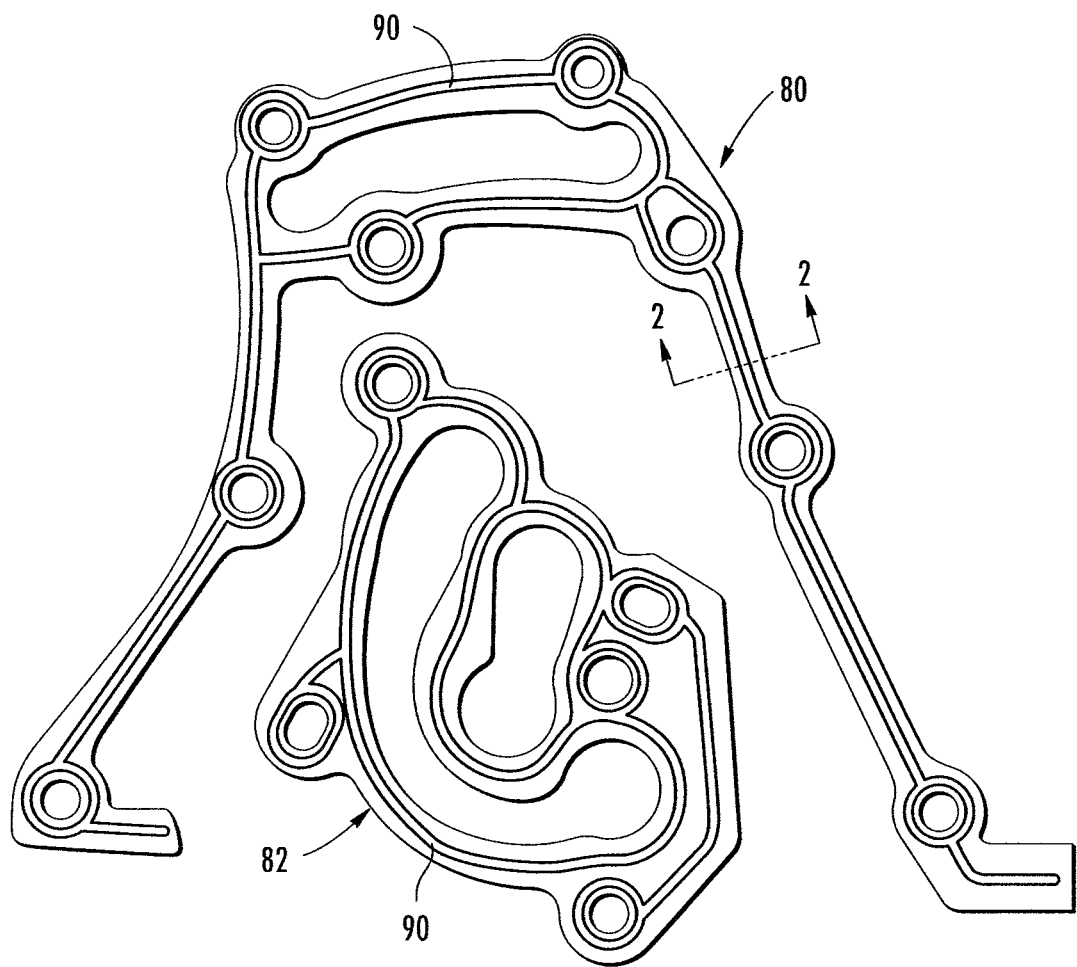
FIG. 1 is a top plan view of two gaskets of a first embodiment of the disclosure.

The various gaskets of the present disclosure may be used for numerous applications including, but not limited to, intake manifold gaskets for internal combustion engines, oil pan gaskets, valve cover gaskets, fuel pump gaskets, differential cover gaskets, transmission cover gaskets, water pump gaskets, air conditioning compressor gaskets, gas meter gaskets, and a variety of coupling flange gaskets for industrial pipelines, steam conduits, and other plumbing connections.

This disclosure relates to a gasket including an adhesive element that adheres to a sealing surface (e.g., flange) and promotes sealing of the joint between two mating, interconnected sealing surfaces. The gasket is intended to offer a specific combination of adhesion strength and compression set resistance. The adhesive element can be carried on a variety of carriers, such as, for example, a flat 40 mesh stainless steel screen impregnated with a polymeric base coating, a fiber gasket material (PF4N), a metal shim, a release carrier, or other suitable materials. Further, the adhesive element of the gasket may be directly applied to the flange surfaces without the use or need of a carrier.

In one embodiment, the adhesive element is a bead that is applied to both surfaces of the carrier. The width and height of the bead can be constant or variable across the surface of the gasket. In one example, the adhesive bead has a width of 4 mm but adhesive beads being otherwise sized are within the scope of this disclosure. In other embodiments, the adhesive element may be applied to the base sheet as a layer of material that partially or fully covers the base sheet. Further, in other alternatives, the adhesive element includes a bead of adhesive material that cooperates with an embossment of the carrier to form a sealing band of the gasket. In still other embodiments, the adhesive element can be applied as a patterned surface partially or fully comprising one or both faces of the gasket.

The gasket may comprise selective combinations of the above-noted alternatives on each side of the gasket. For example, the gasket can comprise a layer of adhesive on one side of the gasket and a bead of adhesive on another side of the gasket. In other embodiments, the gasket includes the adhesive element directly applied to one sealing surface (e.g., flange) surface of a joint comprising interconnected sealing surfaces. In other embodiments, the gasket includes adhesive elements directly applied to both sealing surfaces (e.g., flanges) of a joint comprising interconnected sealing surfaces.

One suitable material for the adhesive element includes water based acrylic latex reinforced with carbon black and crosslinking resins. The adhesive element can be selectively formed into beads using application methods such as jetting technology. Jetting refers generally to the application or dispensing of high viscosity fluids in the form of millions of small highly controlled microdots. In some aspects, jetting of high viscosity fluids bears similarities to ink jet printing, wherein small microdots of a low viscosity fluid, ink, are applied through a printer head to paper in a controlled way to create text, images, and photographs. High viscosity fluid jetting technology has been developed by various companies such as, for example, Asymtek, Inc. of Carlsbad, Calif., U.S.A. and has been used, for instance, in the electronics industry to apply coatings to circuit boards and other components. The technology also has been used to apply adhesives and sealants to joints of various components before they are assembled together. Other suitable application methods for forming and/or applying the adhesive element can include printing (such as silk screen printing) or applying a bead using a robotically controlled needle dispense systems such as are available from EFD Inc., of East Providence, R.I. Reference is made to U.S. application Ser. No. 12/112,434, filed Apr. 30, 200 and published as U.S. Patent Application Publication No. 2008/0280040, which is incorporated by reference herein for all purposes, for disclosure relating to the formation of gaskets with jetting technologies. Furthermore, the adhesive element can be applied to the base sheet or sealing surface by other application methods (e.g., dispensing from a tube or other container) without departing from this disclosure.

The gasket of the present disclosure has properties of compression set resistance and adhesive strength that are tailored to maximize durability and sealability of the gasket.

Carrier/Base Sheet

Any suitable carrier may comprise a base sheet used to form a gasket according to the present disclosure. It will be understood that the particular material selected will depend on the intended application for the gasket and the particular performance requirements for the application. In one particular embodiment, the base sheet or carrier sheet may be selected from materials described herein that are sometimes referred to as being formed from "fibers", "wires", "strands", or "elements" with "interstitial spaces", "interstices", or "void volume" therebetween, collectively and generally referred to as a screen material. However, it will be understood that such terms are not intended to restrict the type of material used to form the base sheet. For example, the base sheet may be formed of materials that are pervious without being fibrous, for example, foams, and that such materials may have what is commonly termed "pores" or "openings", even though the term "interstices" is used.

In other embodiments, the base sheet may be a compressible or substantially rigid material that is a substantially impervious material and is substantially contiguous. A substantially contiguous and impervious base sheet would comprise a material that is uninterrupted across its flange width, that is, the base sheet would be substantially free from pores or interstitial spaces. The base sheet can comprise a fibrous gasket material of a predetermined thickness, other suitable gasket material, or a material suitable for use as a rigid carrier (e.g., metal) of controlled compression rubber gaskets.

Further, the base sheet may comprise any suitable material including such materials disclosed in co-assigned U.S. patent application Ser. No. 11/692,573 (the '573 application), filed Mar. 28, 2007 and published as U.S. Patent Application Publication No. 2007/0228668, the entire contents of which are incorporated by reference herein for all purposes, or the base sheet/carrier may comprise other suitable materials.

In some embodiments, the carrier includes a base sheet and at least one permeating material. Any suitable permeating material may be used to form the gasket, and is selected generally to engage and conform to the shape of, the mating surfaces to provide the desired compression resistance and bulk interstitial sealability for a particular application. In one aspect, the permeating material and base sheet are selected so that the permeating material penetrates a minimal amount of the thickness of the base sheet. In this aspect, the layer of permeating material sometimes may be referred to herein as a "face coating" or "top coating". In another aspect, the permeating material and base sheet are selected so that the permeating material penetrates only a portion of the thickness of the base sheet. In yet another aspect, the permeating material and base sheet are selected so that the permeating material penetrates substantially all of the thickness of the base sheet.

Permeating Material

In embodiments in which a permeating material is present, the permeating material can be selected so that, upon compression, the face/top coating permeating material and base sheet operate in concert to prevent interstitial (when an adhesive element is added to provide interfacial seal) leakage, or both interfacial and interstitial leakage (when no additional adhesive element is added), thereby creating an exceptional, sometimes perfect seal, even under non-ideal conditions. The various mechanisms by which the seal is achieved will be understood by those of skill in the art and described only briefly herein. When the gasket is compressed between two flange surfaces, the face/top coating (where present) or the permeating material proximate the flange surface tends to fill any imperfections such as scratches or roughness in the mating surfaces that otherwise might result in leakage. Further, the face/top coating or the permeating material proximate the flange surface tends to conform to any waviness or deviations from flatness in the mating surfaces that might occur, for example, with slightly warped flanges or with thin flanges that can deflect significantly between bolt holes.

The permeating material can be any suitable material, such as the materials disclosed in the '573 application, or any other suitable material. Further, the carrier may comprise a base sheet and a primary and secondary sealing material. The primary and secondary sealing materials may be any suitable material, such as the materials disclosed in the '573 application, or any other suitable material.

Adhesive Element/Layer

In one embodiment, the adhesive element or layer can include a water based acrylic latex reinforced with carbon black. Further, the materials from which the adhesive element of the present disclosure can be selected from a wide range of possibilities depending upon the mechanical and physical properties and the surface adhesion properties required for a particular application. For instance, these materials, and particularly materials for providing physical or mechanical properties, may be selected from the group consisting of polyacrylates (ACM), acrylonitrile, acryloniotrile butadiene rubber (NBR), hydrogenated acrylonitrile butadiene rubber (HNBR), UV curable acrylic polymer, styrene butadiene rubber (SBR), hydrogenated styrene butadiene rubber (HSBR), fluoroelastomers (such as Viton), acrylic-acrylonitrile copolymers, polyvinylidene chloride, polychloroprene rubber, polyethylene propylene rubber (EPDM), ethylene acrylic copolymer (AEM), ethylene/vinyl acetate polymer, epoxy, fluorosilicones, polyurethane, silicone rubber coatings, polyvinyl chloride (PVC), and copolymers, terpolymers, and mixtures thereof. Some materials with controllable adhesion properties and suitable for use as a coating or a component in a homogeneous blend according to the disclosure include tackifiers and pressure sensitive adhesives as well as polymers, co-polymers, and other materials with adhesive properties. The material can be referred to as an adhesive bead that may have any of a variety of shapes without departing from the scope of this disclosure.

Release Coating/Paper

If desired, a gasket according to the disclosure may include a release coating to reduce undesired adhesion to mating surfaces and to make a spent gasket easier to remove after use. Release coatings typically are very thin, usually having a coating thickness of less than approximately 0.001 inch (0.025 mm), and are designed to be surface coatings that do not penetrate the base sheet of the gasket. Accordingly, release coatings typically do not detrimentally affect the compression resistance of the gasket material. One example of a commonly used release coating is a mica or vermiculite dispersion. Other suitable materials, coatings, papers may be used as the release coating.

In some embodiments, the gasket can comprise an adhesive element that is applied to the release coating/paper prior to application of the gasket to a sealing surface. The adhesive element can be preformed in the desired shape to match the shape of the sealing surfaces. The gasket/adhesive element is applied to the sealing surface and removed from the release carrier/paper prior to forming the mating connection between the sealing surfaces. In such embodiments, the release carrier/paper can remain attached to the gasket, or the gasket can be applied to the sealing surfaces without the use of a release carrier/paper.

Exemplary Embodiments

Various aspects of the disclosure may be illustrated further by referring to the figures. For purposes of simplicity, like numerals may be used to describe like features. It will be understood that where a plurality of similar features are depicted, not all of such features are necessarily labeled on each figure. While various exemplary embodiments are shown and described in detail herein, it also will be understood that any of the features may be used in any combination, and that such combinations are contemplated hereby.

Figure 2:
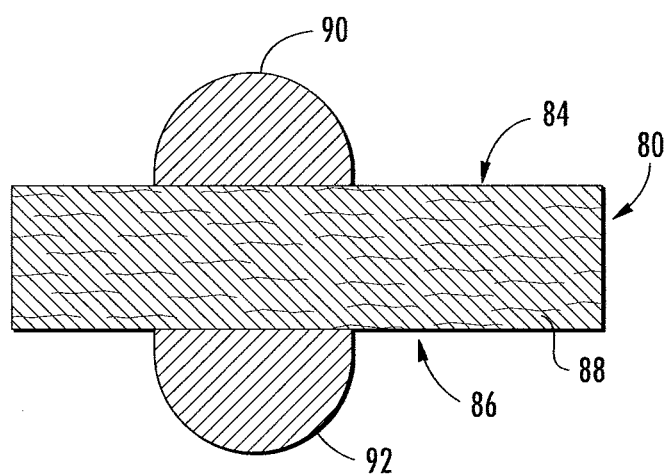
FIG. 2 is a cross-section taken along the plane 2-2 of FIG. 1.

FIG. 1 depicts two exemplary gaskets 80, 82 according to various aspects of the disclosure. FIG. 2 depicts a cross-section of a portion of one of the gaskets 80 shown in FIG. 1. The gasket 80 has an upper face 84, and a lower face 86. The upper face 84 and lower face 86 contact respective sealing surfaces when the gasket 80 is compressed between the sealing surfaces to create a seal and prevent leakage of fluid between the sealing surfaces. The gasket 80 includes a carrier sheet 88 that can be a compressible or non-compressible material. In the illustrated embodiment the carrier sheet 88 is a fibrous material that is impervious, but the carrier sheet could comprise other materials (e.g., nonfibrous, pervious, etc.) without departing from the disclosure. In the illustrated embodiment, the gasket 80 includes an upper adhesive element 90 in the from of a bead on the upper face 84 of the gasket, and a lower adhesive element 92 in the form of a bead on the lower face 86 of the gasket. Either of the upper adhesive element 90 or lower adhesive element 92 may be omitted from the gasket 80 without departing from the disclosure.

Figure 3:
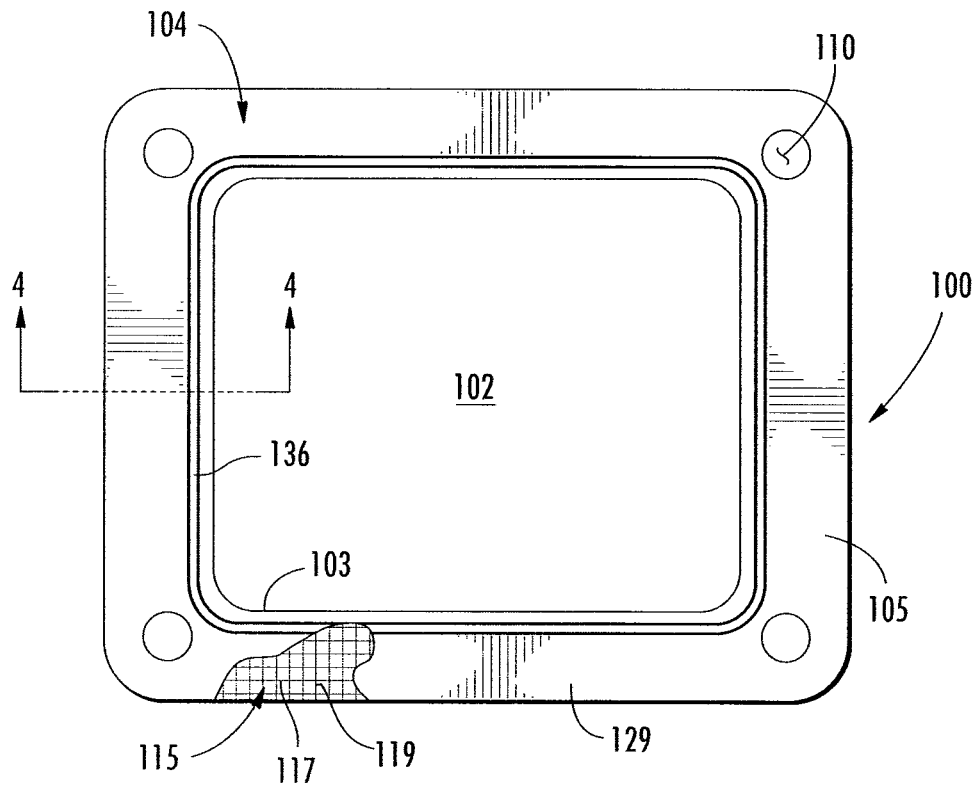
FIG. 3 is a top plan view of a gasket of a second embodiment of the disclosure, with a portion of the gasket removed to show internal details.
Figure 4:
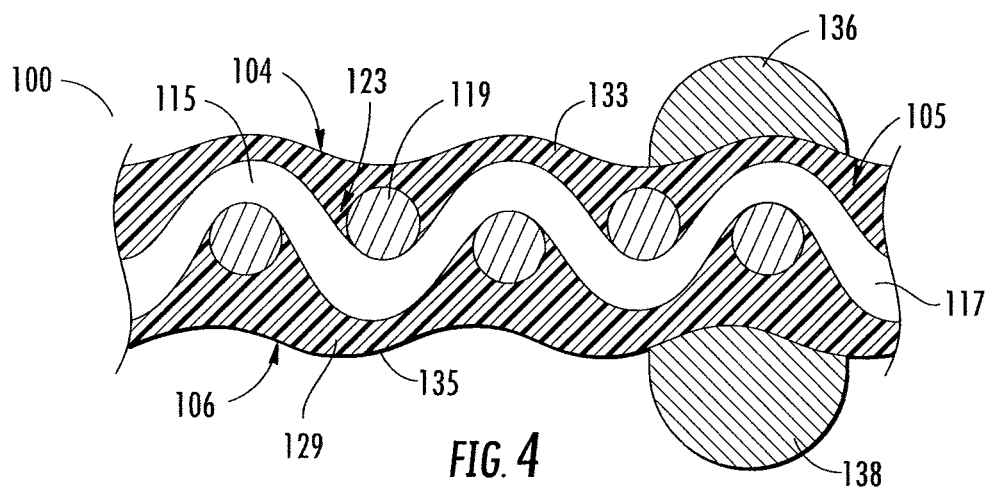
FIG. 4 is a cross-section taken along the plane 4-4 of FIG. 3.

FIGS. 3 and 4 illustrate a gasket 100 of another embodiment of the disclosure. The embodiment of FIGS. 3 and 4 is generally like the previous embodiment, except for variations noted and variations that will be apparent to one of ordinary skill in the art. The gasket 100 has an axial opening 102, an edge 103 forming the axial opening, an upper face 104, and a lower face 106. The gasket 100 has bolt holes 110 in respective corners of the gasket 100 for receiving bolts (not shown) that draw the flanges or sealing surfaces together thus compressing the gasket between the flanges to form a seal. The upper face 104 and lower face 106 contact respective upper and lower sealing surfaces and the bolts are tightened to interconnect the sealing surfaces and compress the gasket 100 between the sealing surfaces to create a seal and prevent the leakage of fluid between the two interconnected surfaces. While a rectangular gasket 100 is illustrated herein, it will be appreciated that the gasket may have any shape needed or desired for a particular application. Further, while a gasket with a single aperture 102 is shown herein, it will be understood that a gasket according to the present disclosure may be configured with two or more apertures and each aperture may seal against a different type of fluid. The present disclosure is applicable to any or all gasket configurations.

As shown in FIGS. 3 and 4, the gasket 100 includes carrier layer 105 comprising a pervious base sheet 115 in the form of a wire mesh having generally parallel first elements 117 and transversely extending second elements 119. In the illustrated embodiment, the base sheet 115 is a steel wire mesh material with interstitial spaces 123 between the elements 117, 119, but the base sheet may have other configurations and include other materials.

In the illustrated embodiment, the carrier layer 105 includes a permeating material 129 covering the base sheet 115 and filling the interstitial spaces 123. In the embodiment of FIGS. 3 and 4, the permeating material 129 is applied in a manner so that the material fills the interstitial spacing of the screen mesh base sheet 115 to provide structural strength to the gasket 100 and bulk sealing properties. Also, the permeating material 129 adheres to the intersecting first and second elements 117, 119 so as to form a top and bottom layer 133, 135, respectively forming at least portions of the upper face 104 and the lower face 106 of the gasket 100. The gasket 100 includes an upper adhesive element 136 on the upper face 104 and a lower adhesive element 138 on the lower face 106. The adhesive elements 136, 138 are attached to the carrier layer 105 at a location generally adjacent the edge 103 forming the opening 102. The adhesive elements 136, 138 could be otherwise shaped, arranged, and/or located. The upper face 104 and lower face 106 of the gasket 100 contact the flange or sealing surfaces and conform to the flange or sealing surfaces so as to create a fluid-tight interface to prevent leakage of fluid between the sealing surface and the respective face of the gasket. In this way, the adhesive elements 136, 138 adhere to the sealing surfaces to enhance the interfacial sealing properties of the gasket 100.

Figure 5:
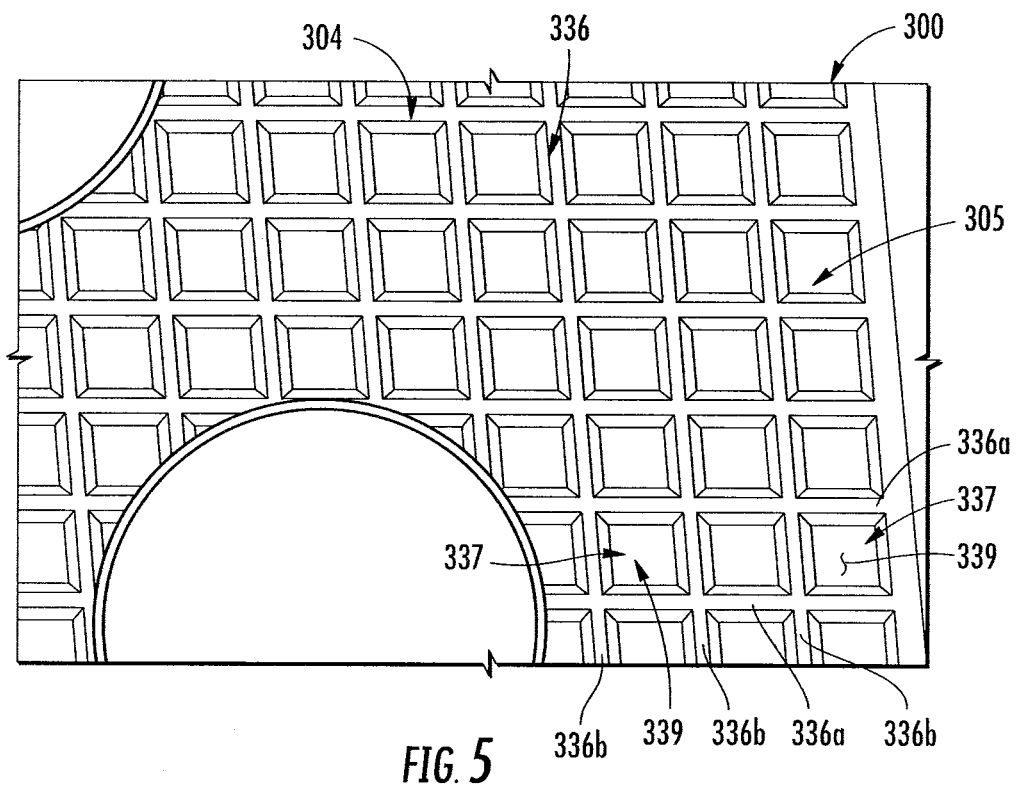
FIG. 5 is a top plan view of a portion of a gasket of a third embodiment of the disclosure.

FIG. 5 depicts an exemplary gasket 300 according to various other aspects of the disclosure. The embodiment of FIG. 5 is generally like the previous embodiments, except for variations noted and variations that will be apparent to one of ordinary skill in the art. In general, this embodiment has a carrier layer 305 comprising a wire mesh screen base sheet similar to the base sheet material 115 of previously described embodiment. The mesh screen base sheet is coated and permeated with an appropriate polymer that is chosen for its sealing characteristics when clamped between flange surfaces. The gasket 300 comprises an adhesive element 336 on the upper surface 304 of the gasket 300 that is applied in a pattern to define a textured surface that, in the preferred embodiment, resembles the surface of a waffle having a plurality of individual cells 337 or portions. More particularly, the cells 337 formed by the adhesive element 336 is formed with intersecting ridges and troughs that define multitudes of roughly square depressions 339 surrounded by raised walls of the intersecting laterally-extending portion 336a of the adhesive element and longitudinally-extending portions 336b of the adhesive element. Each cell 337 is defined by two spaced apart and laterally-extending portions 336a that intersect two spaced apart and longitudinally-extending portions 336b. The bottom or floors of the depressions 339 are generally located at the surface of the base sheet 305, while the intersecting portions 336a, 336b project away from the base sheet.

When the gasket 300 of this embodiment is clamped between two sealing surfaces, each cell 337 of the waffle-like surface of the adhesive element 336 forms a small independently sealed region. Hundreds or thousands of these sealed regions are formed across the face of the gasket 300, which creates an interfacial seal of very high integrity since fluid must breach a multitude of independent and adjacent seals in order to escape the joint. Interstitial leakage is prevented because the polymer material completely permeates the spaces of the screen mesh base sheet of the carrier layer 305. The wire mesh of the base sheet 305 limits and gauges the spacing between the flange or sealing surface to prevent the polymer material from being crushed beyond its elastic limits. In other aspects, the adhesive element 336 can include projections, structures, elements, portions, etc. that are otherwise shaped and arranged.

The gasket 300 of the embodiment of FIG. 5 can include a lower adhesive element that is formed in the same pattern as the upper adhesive element 336, or the lower adhesive element can be otherwise shaped, arranged, and/or positioned.

Figure 6:
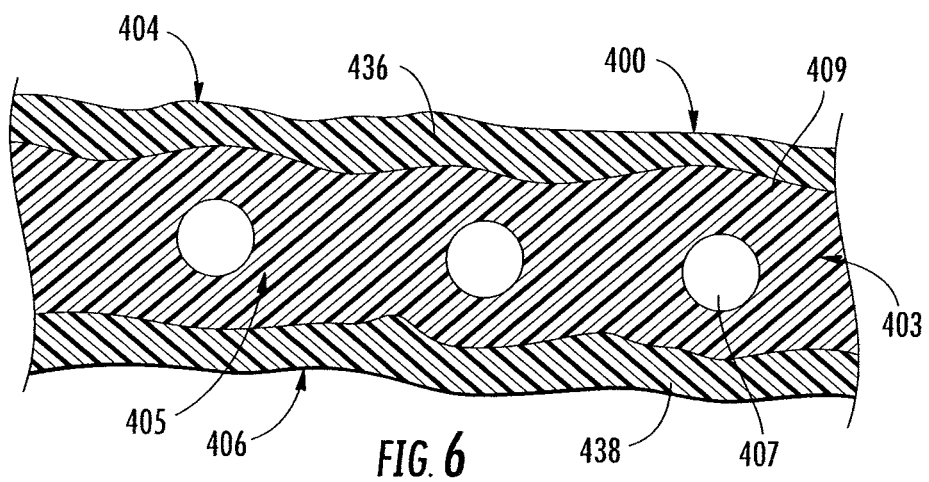
FIG. 6 is a cross-section of a portion of a gasket of a fourth embodiment of the disclosure.

FIG. 6 is a cross-sectional segment of yet another exemplary gasket 400 according to various other aspects of the disclosure. The embodiment of FIG. 6 is generally like the previous embodiments, except for variations noted and variations that will be apparent to one of ordinary skill in the art. The gasket 400 is similar to the previous embodiment in that it includes a pervious base sheet 405 in the form of a mesh screen 407 with a permeating material, or primary sealing material 409, filling the interstitial spaces between the elements of the pervious base sheet. The gasket 400 includes an adhesive element in the form of an adhesive layer 436 that covers substantially all of the top face 404 of the gasket. In the embodiment of FIG. 6, the bottom face 406 of the gasket includes an adhesive layer 438 of adhesive material forming a second adhesive element of the gasket. It is understood that one or both of the adhesive elements 436, 438 could be fully or partially omitted and/or modified without departing from the scope of this disclosure.

Figure 7:
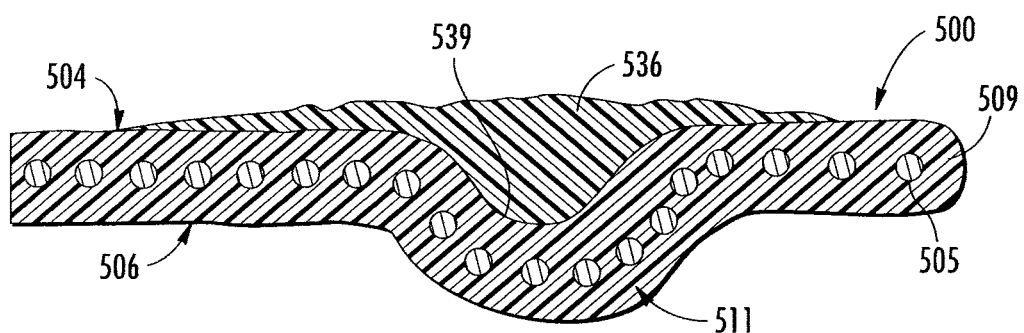
FIG. 7 is a cross-section of a portion of a gasket of a fifth embodiment of the disclosure.

FIG. 7 depicts a schematic of a cross-sectional segment of yet another exemplary gasket 500 according to various other aspects of the disclosure. The embodiment of FIG. 7 is generally like the previous embodiments, except for variations noted and variations that will be apparent to one of ordinary skill in the art. In the embodiment of FIG. 7, the gasket 500 includes a wire mesh base sheet 505 with permeating material 509 and an embossment 511 and an indentation 539. As shown in FIG. 7, the embossment 511 has an adhesive element 536 that fills the indentation 539 of the embossment and forms a portion of the upper face 504 of the gasket 500. As with the previous embodiments, the adhesive element 536 enhances the adhesive properties of the gasket 500. The embossment 511 could be on the upper face 504 of the gasket and the adhesive element 536 could comprise a portion of the lower face 506 of the gasket without departing from the disclosure.

Figure 8:
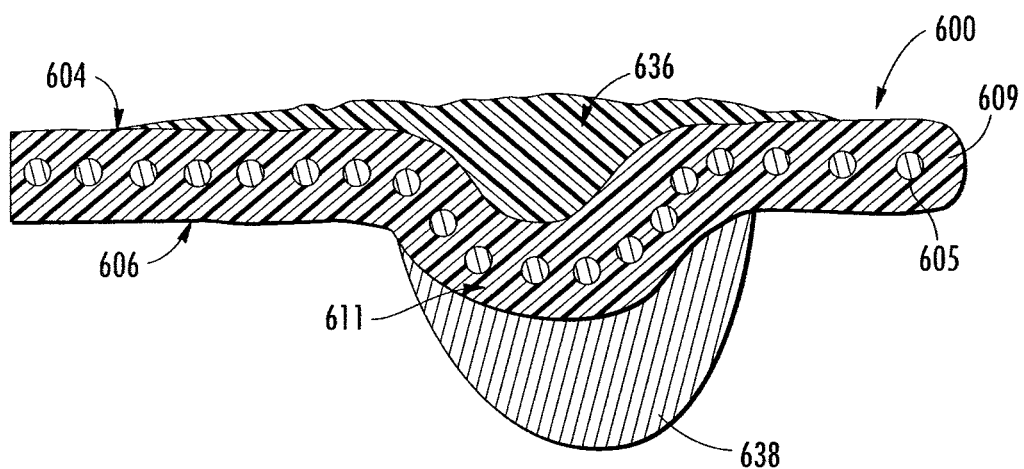
FIG. 8 is a cross-section of a portion of a gasket of a sixth embodiment of the disclosure.

FIG. 8 depicts a schematic of a cross-sectional segment of yet another exemplary gasket 600 according to various other aspects of the disclosure. The embodiment of FIG. 8 is generally like the previous embodiment, except for variations noted and variations that will be apparent to one of ordinary skill in the art. In the embodiment of FIG. 8, the gasket 600 includes an adhesive element 636 in the indention 639 of the embossment 611 that forms a portion of the upper face 604 of the gasket. The gasket 600 further includes a second adhesive element 638 on the lower face 606 of the gasket. In the illustrated embodiment, the second adhesive element 638 is located on the embossment 611, but the second adhesive element could be otherwise located.

Figure 9:
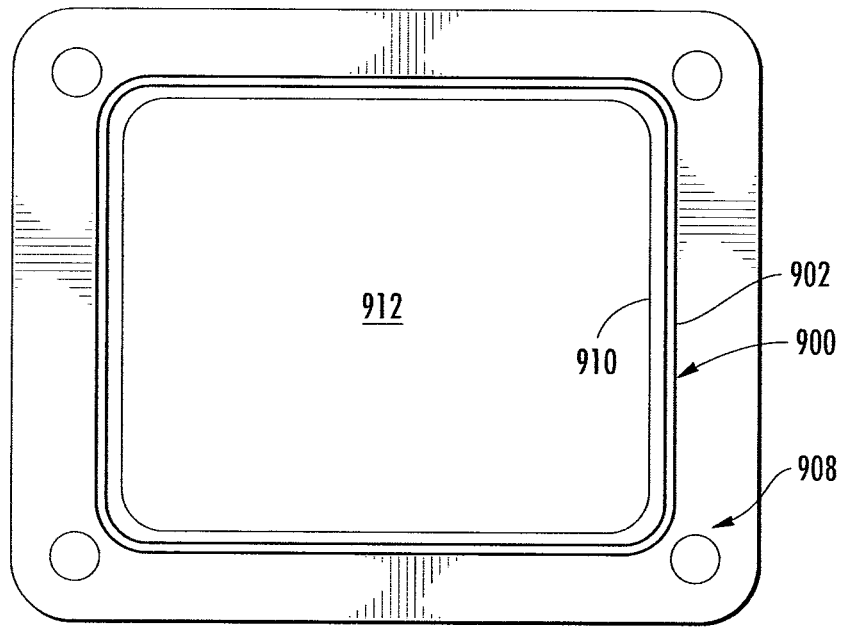
FIG. 9 is a top plan view of a gasket of a seventh embodiment of the disclosure.
Figure 10:
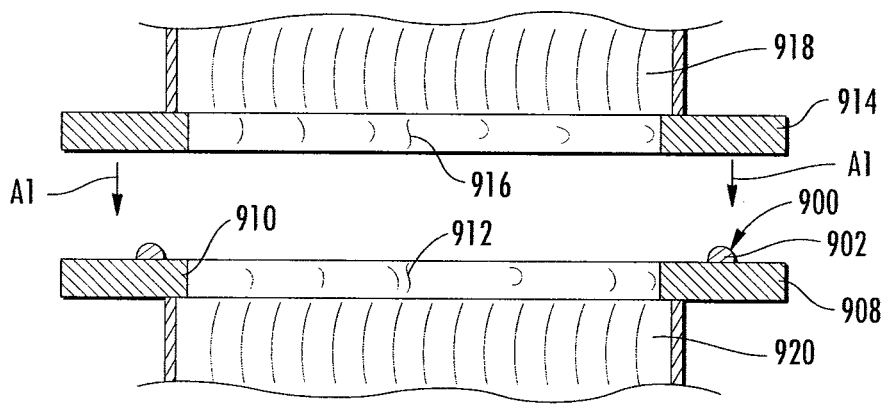
FIG. 10 is a partial cross-section of the gasket of the seventh embodiment between two sealing surfaces prior to interconnection of the sealing surfaces.

FIGS. 9 and 10 illustrate another exemplary gasket 900 according to various other aspects of the disclosure. The gasket 900 comprises an adhesive element 902 or bead applied to a sealing surface (e.g., lower flange 908 in FIG. 10) generally adjacent to an edge 910 of the flange forming an opening 912 for fluid flow. The adhesive element 902 provides a seal between the lower flange 908 and upper flange 914 when the flanges are interconnected by moving the upper flange in the direction of arrows A1 and securing the flanges by appropriate fasteners (e.g., bolts). The upper flange 914 includes an opening 916 that is for fluid flow. In the illustrated embodiment the upper flange 914 is connected to an upper pipe 918 and the lower flange is connected to a lower pipe 920. When the flanges are interconnected fluid is transferred between the upper and lower pipes 918, 920 by flow through the openings 916, 912 in the flanges 914, 908. The adhesive element adhesively attaches to both of the flanges 914, 916 when the flanges are interconnected and prevents the leakage of fluid from the adjacent openings 916, 912 between the interconnected flanges.

The adhesive element 902 may be preformed on a carrier that comprises a release carrier or release paper and applied to the lower flange 908 prior to connecting the upper flange 914 with the lower flange. Further, the adhesive element 902 may be otherwise formed, shaped, arranged, etc. without departing from the scope of this disclosure. The adhesive element 902 can be initially applied to the upper flange 914 without departing from this disclosure. Further, two adhesive elements 902 can be used to seal the sealing surfaces 914, 908 by applying one adhesive element to each of the sealing surfaces without departing from this disclosure.

Although certain embodiments of this disclosure have been described above with a certain degree of particularity, those skilled in the art could make numerous alterations to the disclosed embodiments without departing from the spirit or scope of this disclosure. Any directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present disclosure, and do not create limitations, particularly as to the position, orientation, or use of the embodiments unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

While the present disclosure is described herein in detail in relation to specific aspects, it is to be understood that this detailed description is only illustrative and exemplary of the present disclosure and is made merely for purposes of providing a full and enabling disclosure. It will be recognized by those skilled in the art, that various elements discussed with reference to the various embodiments may be interchanged to create entirely new embodiments coming within the scope of the present disclosure. It is intended that all matter contained in the above description or shown in the accompanying drawings shall be interpreted as illustrative only and not limiting. Changes in detail or structure may be made without departing from the spirit of the disclosure. The detailed description set forth herein is not intended nor is to be construed to limit the present disclosure or otherwise to exclude any such other embodiments, adaptations, variations, modifications, and equivalent arrangements of the present disclosure.

The foregoing description illustrates and describes various embodiments of the present disclosure. As various changes could be made in the above construction, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments that are within the scope of the claims. Additionally, the disclosure shows and describes only selected embodiments, but the embodiments are capable of use in various other combinations, modifications, and environments and are capable of changes or modifications, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

Experimental Results

Samples representing exemplary materials for use in gaskets of the present disclosure were evaluated for compression set resistance and adhesive strength. The evaluation is presented in the following tables. Durability of the samples was measured by following the general guidelines outlined in the General Motors Corporation Worldwide Engineering Standards, Test Procedure GM3155, entitled "Thermal Cycling for Life Assessment of Powertrain Sealing Systems", published July 2004, the entire content of which is incorporated by reference for all purposes. Interface Solutions, Inc. (ISI) has developed an internal durability test, referred to as IS13155, that generally follows the procedures and steps of the GM3155 test procedure. The IS13155 procedure differs from GM3155 test procedure in the fact that the IS13155 procedure does not include the step of circulating oil in the test fixture as is specified in the GM3155 procedure. Compression set was measured by Test Method B of ASTM Standard D395-98, entitled "Standard Test Method for Rubber Property—Compression Set," the entire content of which is incorporated by reference for all purposes, (after 70 hours of compression at 300 degrees F.). Adhesive strength of the samples was tested by using the Adhesion Test Procedure that is described below and in the incorporated by reference U.S. Provisional Patent Application No. 61/041,648. The PTO cover joint refers to a rectangular Power Take Off (PTO) cover that is used to quantify differences in the durability of gasket constructions by preparing test gaskets and subjecting them to a thermal chamber durability cycle using the ISI3155 test cycle.

TABLE 1

Acrylic coatings with differing Adhesive force and compression set

| Adhesive force (lbs) | Compression set* (%) | Coating Designation |
|---|---|---|
| 155 | 100 | A9 |
| 65 | 68 | D |
| 60 | 90 | W |
| 21 | 26 | C |
| 90 | 94 | AC15 |
| 35 | 90 | SAS14 |

TABLE 2

Beaded constructions tested using CAT PTO
(uniform height bead)

| Adhesive force | Compression set | Durability hours, 15 ftlb torque Beaded | Bead width mm | Bead Height (each side) inches | | Carrier | Polymer ID |
|---|---|---|---|---|---|---|---|
| | | | | bolt hole | mid span | | |
| 155 | 100 | 1100-2100 | 2 | 0.0015 | 0.0015 | coated screen | A9 |
| 155 | 100 | >2500* | 4 | 0.0015 | 0.0015 | coated screen | A9 |
| 155 | 100 | >2500* | 4 | 0.0035 | 0.0035 | coated screen | A9 |

*current hours accured - construction still under test

TABLE 3

Beaded constructions tested using Ford Lynx waterpump
(uniform and variable height bead)

| Adhesive force | compression set | Durability hours, 15 ftlb torque Beaded | Bead width mm | Bead Height (each side) inches | | Carrier | Polymer ID |
|---|---|---|---|---|---|---|---|
| | | | | bolt hole | mid span | | |
| 155 | 100 | >692* | 4 | 0.0011 | 0.007 | coated screen | A9 |
| 155 | 100 | >2500* | 4 | 0.0035 | 0.0035 | coated screen | A9 |

*current hours accured - construction still under test

TABLE 4

Beaded constructions tested using Chrysler waterpump
(uniform height bead)

| Adhesive force | compression set | Durability hours, 15 ftlb torque Beaded | Bead width mm | Bead Height (each side) inches | | Carrier | Polymer ID |
|---|---|---|---|---|---|---|---|
| | | | | bolt hole | mid span | | |
| 155 | 100 | >2500* | 4 | 0.0014 | 0.0014 | coated screen | A9 |
| 155 | 100 | >2500* | 4 | 0.0265 | 0.0265 | coated screen | A9 |

*current hours accured - construction still under test

TABLE 5

Comparison of Durability of differing 4 mm wide beaded constructions
(uniform height bead)

| Adhesive force | compression set | Durability hours, 15 ftlb torque | | | Construction | Polymer ID |
|---|---|---|---|---|---|---|
| | | Beaded | Full embossed | Full | | |
| 155 | 100 | >2000* | >2200* | >1500* | XGEN | A9 |
| 155 | 100 | 1700 | not tested | >1500* | steel shim | A9 |
| 155 | 100 | >2000* | not tested | not tested | fiber gasket | A9 |
| 155 | 100 | >1800* | not tested | not tested | release paper | A9 |
| 155 | 100 | >2000* | not tested | not tested | direct application | A9 |
| 65 | 68 | 600 | not tested | not tested | XGEN | D |

TABLE 5-continued

Comparison of Durability of differing 4 mm wide beaded constructions
(uniform height bead)

Durability hours, 15 ftlb torque

| Adhesive force | compression set | Beaded | Full embossed | Full | Construction | Polymer ID |
|---|---|---|---|---|---|---|
| 65 | 68 | 1000 | not tested | not tested | fiber gasket | D |
| 60 | 90 | not tested | 2200 | not tested | XGEN | W |
| 21 | 26 | 300 | not tested | not tested | XGEN | C |
| 90 | 94 | not tested | not tested | >1500* | steel shim | AC15 |

*current hours accured - construction still under test

TABLE 6

Results of PTO-Cover Seal Durability Tests:

| Product form | Carrier | Seal polymer | Torque (ft-lbs) | Seal durability, hrs |
|---|---|---|---|---|
| Acrylic Polymer Beaded (Bead width 4 mm) | 1° Coated (X polymer) SS screen | A9 (Compounded acrylic formulation) | 15 | >2000 |
| | | | 8 | 500-1000 |
| | Metal (Stainless Steel) sheet (10 mils thick) | | 15 | 1700 |
| | | | 8 | 500-1000 |
| | 0.031" PF-4N (fiber gasket) | | 15 | >2000 hrs expected (TBT) |
| | Release paper (discarded) | | 15 | >1800 (ongoing) |
| | None (beading on bases directly) | | 15 | >2000 expected (TBT) |
| | 1° Coated (X polymer) SS screen | D & W (Compounded acrylic formulations) | 15 | 300-800 |
| | | | 8 | 100-400 |
| | 0.031" PF-4N (fiber gasket) | | 15 | 600-1300 |
| | | | 8 | 200-600 |
| | 1° Coated (X polymer) SS screen | B (Acrylic formulation) | 15 | 500-1000 |
| | | | 8 | 200-500 |
| | 1° Coated (X polymer) SS screen | C (Acrylic formulation) | 15 | 250-400 |
| | | | 8 | 50-150 |
| Full Coated & Embossed | 1° Coated (X polymer) SS screen | A9 (Compounded acrylic formulation) | 15 | >2200 (ongoing) |
| | | | 8 | >2200 (ongoing) |
| | Plain stainless steel screen | | 15 | >2200 (ongoing) |
| | | | 8 | >2200 (ongoing) |
| | 1° Coated (X polymer) SS screen | W (Compounded acrylic) | 15 | 1500-3000 |
| | | | 8 | 400-600 |
| Full Coated (no embossment) | 1° Coated (X polymer) SS screen | A9 (Compounded acrylic formulation) | 15 | >1500 (ongoing) |
| | | | 8 | >1500 (ongoing) |
| | Plain stainless steel screen | | 15 | >1500 (ongoing) |
| | | | 8 | >1500 (ongoing) |
| | Plain stainless steel screen | AC15 | 15 | 1000-1200 |
| | | | 8 | 400-500 |

Test conditions: PTO-cover joints with aluminum covers on steel bases; 50 psi internal pressure; Service fluid 105 oil; ISI thermal cycle for oil tests.

TABLE 7

Adhesion Property of A9 Polymer Under Various Conditions

| Temperature | Time | Medium | Adhesion strength (lbs pull) |
|---|---|---|---|
| 300° F. | 22 hours | Air | 155 |
| 300° F. | 2 hours | Air | 120 |
| 300° F. | 22 hours | Oil contaminated | 126 |
| ISI3155 cycle * | 1 week | Air | 150 |
| ISI 4 hours cycle ** | 1 week | Air | 149 |
| Room Temperature | 4 days | Air | 42.3 |
| Room Temperature | 1 month | Air | In test |
| Room Temperature | 3 months | Air | In test |

* ISI3155 cycle - temperature varies according to schedule listed below in Table 8
** ISI 4 hour cycle - 2 hours @ 150 degrees C., 2 hours @ −40 degrees C.

TABLE 8

| ISI3155 Temperature cycle | | | | |
|---|---|---|---|---|
| | Hours at Temperature (° C.) | | | |
| Day of Week 1 | 135 | −18 | 150 | −40 |
| Monday | 14 | | | 10 |
| Tuesday-Thursday | 18 | 6 | | |
| Friday | 13 | 6 | 5 | |
| Saturday | | | 24 | |
| Sunday | | | 22 | 2 |
| One Week Totals | 81 | 24 | 51 | 12 |

In the above results shown in Table 6, acceptable gasket durability was demonstrated by (1) using a 4 mm wide A-9 bead the measures 0.002-0.004" high on each side of a screen or other carrier; (2) by applying a full coat of A-9 polymer at least 0.002 inches uniformly thick on each side of a screen or other carrier and embossing the screen to concentrate the load; and (3) by applying a full coat of A-9 polymer at least 0.0025 inches uniformly thick on each side of a carrier. Although the work in Table 6 was completed using a polyacrylate polymer, the use of fluoroelastomers, NBR, AEM or EPDM polymer system is possible depending upon the fluid to be sealed or temperature extreme in a given joint.

The following is a description of the materials used in the Experiments and listed in the above data summaries. The below description of material is intended to describe the actual materials of the samples tested and it is understood that other suitable material may be used without departing from the disclosure.

Carrier/Base Sheets

XGEN carrier: This is a gasket carrier comprised of a 40 mesh stainless steel screen (40×40 weave using 0.010 inch diameter wire) that has been impregnated with a coating to seal the openings in the weave. The coating used to seal the screen and make it impermeable is the X coating (see description below). The amount of coating is minimized to prevent loss of bolt load due to creep relaxation of the polymer. We describe the impregnated screen as a "preload". Typically, the thickness of the XGEN preload will not exceed 0.022 inch. The preload is then covered with a secondary polymer (either full coat or a bead) using one of the other polymers below. It is also possible to add an embossment to the XGEN carrier.

Steel sheet/shim: 10 mils thick stainless steel

Release Paper: Paper coated with a release coating that enables the adhesive element to release from the carrier and be transferred to a joint.

Plain SS Screen: 40 mesh stainless steel screen (40×40 weave using 0.010 inch diameter wire), uncoated with polymer or other material.

Coatings/Polymers

All the coatings used in Table 1 are acrylic latex based coatings having a sufficient heat resistance and oil resistance (e.g., will not swell, degrade, soften, or harden when exposed to temperatures of 175 degrees C. of greater and oils in the joint).

X: The coating used to preload the screen (also referred to as a primary coating in applications using a dual polymer system). Relatively harder & stronger than all other coatings (e.g., secondary coatings). Tg>0 degrees C.

A9: A compounded acrylic formulation (loaded with carbon black & curing package) secondary coating that has high adhesion to metals & can deliver the seal performance/durability we need. Tg<0 degrees C.

D: A compounded acrylic formulation (loaded with carbon black & curing package) secondary coating that was formulated to deliver Compression seal, but typically falls short on seal performance/durability. Tg<0 degrees C.

W: Another compounded acrylic formulation (loaded with carbon black & curing package) secondary coating that was formulated to deliver Compression seal, but typically falls short on seal performance/durability. Tg<0 degrees C.

AC15: A9 polymer that is cured at 300 degrees F. for 15 minutes, which has much lower adhesion to metals and results in much lower seal durability (falls short of the performance requirement) than the uncured A-9. Tg<0 degrees C.

SAS14: An un-compounded acrylic secondary coating that functions well (primarily by adhesion mechanism) in our other seal technology—Rubber-Edged Composites. Tg<−20 degrees C.

B: Another un-compounded acrylic secondary coating that functions well through adhesion mechanism in our other seal technology—Rubber-Edged Composites. Tg<−20 degrees C.

C: Another un-compounded acrylic coating that functions well (primarily by compression mechanism instead) in our other seal technology—Rubber-Edged Composites. Tg<−20 degrees C.

Adhesion Test Procedure 1.0 Procedure:
1.1 Collect materials
1.2 Wash rings in acetone bath using beaker.
1.3 Using tongue depressor stir coating until sufficiently mixed.
1.4 Grab one ring with tweezers so the tweezers are perpendicular to the plane of the ring as in FIG. 2.
1.5 Dip ring in coating being careful not to get coating on the opposite side of the ring.
1.6 Pull ring out and twist wrist so that the coating side is facing up.
1.7 Using tweezers poke out the film that is formed in the center of the ring.
1.8 Grab the ring with the tweezers so that the tweezers are perpendicular to the plane of the ring and the coated side is facing up.
1.9 Place the ring on a Teflon covered baking sheet.
1.10 Squeeze the tweezers together to form a needle and swirl around the inside of the ring.
Repeat steps 3-9 until the desired number of rings is coated for that coating.
1.12 Repeat steps 2-10 until all coatings are finished.
1.13 Preheat oven to desired temperature.
1.14 Once preheated place Teflon covered baking sheet in oven and bake for desired time. Make sure Teflon paper is secured to the pan because the air circulation in the oven can lift the paper and scatter the rings.
1.15 Remove using oven mitts when done and turn off oven.
1.16 Cool for 30 minutes and then bring baking sheet to functional test laboratory.
1.17 Gather materials for fixture assembly.
1.18 Put ⅜" bolt plate in vise.
1.19 Assemble torque meter with ¼" drive, ¼" transducer, ¼"-⅜" adapter and 9/16" socket as seen in FIG. 5.
1.20 Wipe down top and bottom fixture faces with acetone soaked towel and record their ID.
1.21 Remove nut and washer from bolt combination and place bolt upside down in bolt plate.
1.22 Place bottom fixture upside down centered on bolt.
1.23 Place a ring centered on the fixture and record the coating ID with the fixture ID that it is assembled.
1.24 Place the other fixture face down centered on top of the ring.

1.25 Place a washer on the bolt and nut on top of the washer tightening the nut until it is snug.
1.26 Using the torque meter tighten the nut-bolt to 5.6 in-lbs which equals 300 psi on the ring. The assembled fixture should look like in FIG. 7.
1.27 Remove the assembled fixture from the bolt plate and place it on a cart for transport.
1.28 Repeat steps 18-25 until all fixtures are assembled.
1.29 Preheat oven to desired temperature (300 degrees F.).
1.30 Transport fixtures on cart to oven room and once oven is preheated place all of the fixtures in the oven using the oven mitts and record the time and temperature in oven.
1.31 Using oven mitts remove fixtures from oven after baked for desired time and place them on a cart. Record time and temperature when extracted.
1.32 Turn off oven.
1.33 Put the cart in front of the fan in the oven room and allow the fan to blow cool air over the fixtures as in FIG. 8. Remember to place a "Caution Hot" sign on the cart.
1.34 After cooling for at least 30 minutes cart the fixtures into the functional lab room and remove the bolt combination from each fixture.
1.35 Place the 1000 lbf load cell on the Tinius Olsen Tensiometer.
1.36 Set the pull rate to 0.05 in/s. Zero the force. Set the mode on tensile. Once zeroed put on "Peak Hold".
1.37 Place the upper handles of one fixture in the upper jaw of the tensiometer. Raise the lower jaw and do the same for the lower handles.
1.38 Pull the fixture at a speed of 0.05 in/s. Record the force. Remove the fixture.
1.39 Using a brass chisel and hammer, knock the adhesion ring off the fixture and place the ring in a beaker of acetone.
1.40 Scrape any excess polymer from the top and bottom fixture with a razor blade.
1.41 Sand the top and bottom fixtures with 400-grit sandpaper.
1.42 Wipe the fixtures down with acetone and place in the proper drawer.
1.43 Extract one ring from acetone bath using tweezers.
1.44 With razor blade scrape as much of the polymer off the two faces of the ring as possible.
1.45 Sandblast rings 3-4 at a time using aluminum dowel rod.
1.46 Bathe in acetone to clean off any debris from sandblasting.

What is claimed is:

1. A gasket for providing a seal between a first sealing surface and a second sealing surface, the gasket comprising:
a base sheet having a shape, oppositely facing first and second surfaces, at least one aperture having an interior edge, and at least one bolt hole formed through the base sheet;
a bead of adhesive material disposed on a selected surface of the base sheet, the adhesive material of the bead being formulated to adhere to one of the first sealing surface and the second sealing surface when the gasket is disposed between the sealing surfaces;
the bead of adhesive material having a height above the selected surface and having a width less than a width of the selected surface; and
the bead being uninterrupted along its extent and having a shape that substantially corresponds to the shape of the base sheet and surrounds the at least one aperture proximate the interior edge of the aperture, and surrounds the at least one bolt hole, with at least a portion of the bead forming a seal between the at least one aperture and the at least one bolt hole.

2. The gasket of claim 1 wherein the adhesive material is selected from the group consisting of acrylic, acrylic latex, polyacrylates, UV curable acrylic polymer, or acyrlonitrile.

3. The gasket of claim 1 wherein the at least one bead of adhesive material comprises an upper bead of adhesive material disposed on the first surface of the base sheet and a lower bead of adhesive material disposed on the second surface of the base sheet, the lower bead of adhesive material being substantially transversely aligned relative to the base sheet with the upper bead of adhesive material.

4. The gasket of claim 3 wherein the base sheet comprises a fluid pervious material.

5. The gasket of claim 1 wherein the base sheet comprises an embossment having an indentation, the at least one bead of adhesive material substantially filling the indentation of the embossment.

6. The gasket of claim 5 wherein the at least one bead of adhesive material further comprises a second bead of adhesive material on the opposite side of the base sheet substantially on the embossment.

7. The gasket of claim 1 wherein the base sheet comprises a material that is substantially impervious to fluid.

8. The gasket of claim 7 wherein the base sheet comprises a mesh of intersecting elements defining interstitial spaces and a base coating on the mesh permeating the interstitial spaces and rendering the base sheet substantially impervious to fluid, the bead of adhesive material being disposed on the base coating.

9. The gasket of claim 1 wherein the base sheet comprises a material that is substantially pervious to fluid.

10. The gasket of claim 9 wherein the base sheet comprises a mesh material having parallel first elements and transversely extending second elements, the first and second elements defining interstitial spaces between the intersecting first and second elements and a permeating material at least partially covering the base sheet and at least partially filling the interstitial spaces.

11. The gasket of claim 10 and wherein the first and second elements of the mesh material are made of metal.

12. The gasket of claim 1 wherein the base sheet comprises a mesh material.

13. The gasket of claim 12 wherein the mesh material comprises a screen.

14. The gasket of claim 1 wherein the bead of adhesive material is disposed between edges of the base sheet throughout the extent of the bead.

15. The gasket of claim 1 wherein the bead of adhesive material has a width that varies across the selected surface of the base sheet.

16. The gasket of claim 15 wherein the bead of adhesive material has a height that varies across the selected surface of the base sheet.

17. The gasket of claim 1 wherein the bead of adhesive material is substantially homogenous throughout.

18. The gasket of claim 1 wherein the selected surface of the base sheet is substantially smooth and without a recess.

19. A gasket for providing a seal between a first sealing surface and a second sealing surface, the gasket comprising:
a base sheet having an irregular shape with at least one elongate protuberance lying in a plane of the base sheet and that is unbounded on three sides, oppositely facing first and second surfaces, and at least one aperture having an interior edge and at least one bolt hole formed through the base sheet;

a bead of adhesive material disposed on a selected surface of the base sheet and spaced from the interior edge of the at least one aperture and the at least one bolt hole, the adhesive material of the bead being formulated to adhere to one of the first sealing surface and the second sealing surface when the gasket is disposed between the sealing surfaces, and the bead being uninterrupted along its extent and having a shape that substantially corresponds to the irregular shape of the base sheet and surrounds the at least one aperture proximate the interior edge of the aperture, surrounds the at least one bolt hole, and having an elongate segment extending down a central portion of the elongate protuberance, with at least a portion of the bead forming a seal between the at least one aperture and the at least one bolt hole.

20. The gasket of claim 19 wherein the bead of adhesive material is substantially homogenous throughout.

\* \* \* \* \*